United States Patent
Chia

(10) Patent No.: US 11,976,905 B2
(45) Date of Patent: May 7, 2024

(54) TARGET SYSTEMS AND RELATED METHODS

(71) Applicant: EASTON SPORTS DEVELOPMENT FOUNDATION, Salt Lake City, UT (US)

(72) Inventor: Keaton Chia, Chula Vista, CA (US)

(73) Assignee: EASTON SPORTS DEVELOPMENT FOUNDATION, Salt Lake City, UT (US)

( * ) Notice: Subject to any disclaimer, the term of this patent is extended or adjusted under 35 U.S.C. 154(b) by 325 days.

(21) Appl. No.: 17/405,297

(22) Filed: Aug. 18, 2021

(65) Prior Publication Data

US 2022/0074716 A1 Mar. 10, 2022

Related U.S. Application Data

(60) Provisional application No. 63/074,815, filed on Sep. 4, 2020.

(51) Int. Cl.
| | |
|---|---|
| *F41G 3/00* | (2006.01) |
| *F41J 3/00* | (2006.01) |
| *F41J 9/14* | (2006.01) |
| *G06T 7/73* | (2017.01) |
| *G09G 3/00* | (2006.01) |

(52) U.S. Cl.
CPC ............... *F41J 9/14* (2013.01); *F41J 3/0004* (2013.01); *G06T 7/73* (2017.01); *G09G 3/002* (2013.01); *G06T 2207/30221* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 5,566,951 A | 10/1996 | Part et al. | |
| 10,054,397 B1 * | 8/2018 | Reimer | ................... F41G 1/473 |
| 2005/0017456 A1 | 1/2005 | Shechter | |

(Continued)

OTHER PUBLICATIONS

International Search Report and Written Opinion issued in International Application No. PCT/US2021/046394 dated Dec. 9, 2021, 15 pages.

(Continued)

*Primary Examiner* — Sunit Pandya
(74) *Attorney, Agent, or Firm* — DORSEY & WHITNEY LLP

(57) ABSTRACT

A target system can detect the location of a projectile disposed within a target and subsequently alter an image being displayed on the target in response to the location of the detected projectile. The target system can include a sensor, an image source, a portable electronic device, and a computing device. The sensor can be positioned on the target to detect the location of the projectile on a face of the target. The image source can project an image onto the face of the target. The portable electronic device can receive input from a user to dictate the image(s) displayed on the target. The computing device can be communicatively coupled to the sensor, the image source, and the portable electronic device and cause the target system to detect the location of the projectile and subsequently alter the image displayed on the target in response to the location.

22 Claims, 7 Drawing Sheets

(56) References Cited

U.S. PATENT DOCUMENTS

| | | |
|---|---|---|
| 2008/0213732 A1 | 9/2008 | Manard et al. |
| 2014/0123531 A1* | 5/2014 | Hancosky ................. F41G 1/35 |
| | | 42/114 |
| 2015/0123346 A1* | 5/2015 | Mason ....................... F41J 5/02 |
| | | 273/371 |
| 2016/0370148 A1* | 12/2016 | Hancosky ............... F41G 1/345 |
| 2017/0307341 A1 | 10/2017 | Hollinger et al. |
| 2019/0180470 A1 | 6/2019 | Otte et al. |

OTHER PUBLICATIONS

Big Shot Targets: https://bigshottargets.com/product/pro-shop-48x66-hunt-simulator-w-reactive-screen/.
Bows n Arrows (India): https://www.thebowsandarrows.com/.
Fivics Cafe Vision Scoring: https://www.youtube.com/watch?v=n5BeTMSSZ-I.
Fivics Screen Archery: https://www.youtube.com/watch?v=iw737PgVUSA.
http://archerytime.de/.
Technohunt in Store: https://www.averagejoesarchery.com/products/shooting-range/technohunt/.

* cited by examiner

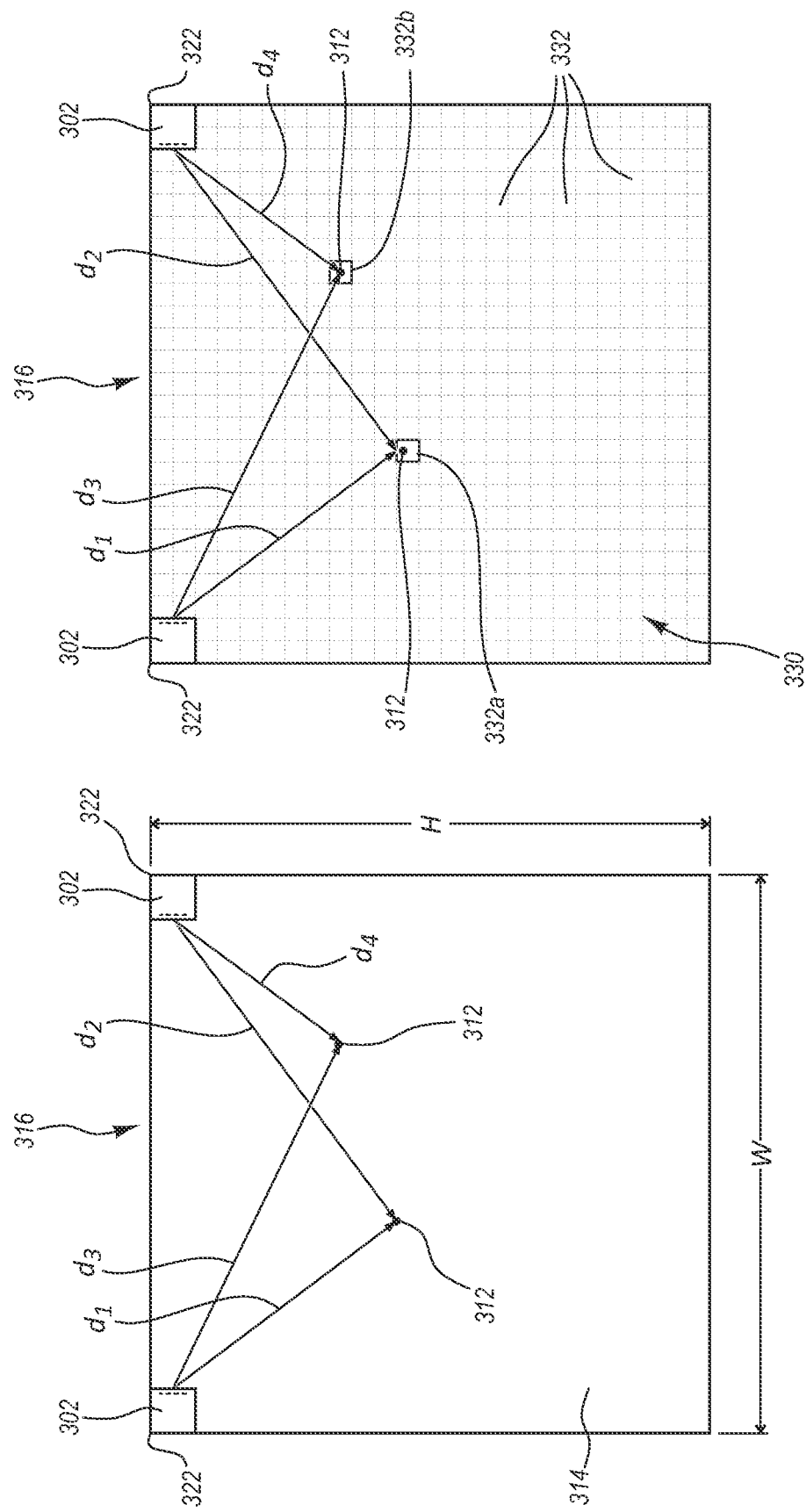

TARGET SYSTEMS AND RELATED METHODS

RELATED APPLICATION

This application claims the benefit of U.S. Provisional Application No. 63/074,815, filed 4 Sep. 2020, which is hereby incorporated by reference herein in its entirety.

FIELD

The present disclosure relates generally to target systems. More particularly, the present examples relate to interactive target systems which utilize projectiles.

BACKGROUND

Archery is a sport in which an archer draws and releases a bowstring of an archery bow to launch an arrow or other projectile down-range. Like many other athletes, the archer must consistently practice to develop the strength and muscle memory required to execute a shot using the proper form and technique required to accurately and repeatedly hit a target. Whether for recreation or under the rigors of an organized competition, multiple archers can compete against one another by launching arrows into respective targets. For example, each archer's target can include a sheet of paper having multicolored rings forming a bullseye-type image printed thereon. Each of the multicolored rings can garner an archer respective points when pierced by the archer's arrow and the archer with the most points at the end of the competition is the winner.

However, whether for practice or competition, an archer can find repeatedly shooting a fixed target face tedious, monotonous, or otherwise unentertaining. Moreover, repeatedly shooting a fixed target face may not provide the most efficient mechanism for developing an archer's skillset. Thus, improvements and advances to target systems for archery bows can be desirable to provide mechanism for further developing an archer's capabilities while better keeping their interest and potentially making such exercises entertaining.

SUMMARY

Embodiments of the present disclosure relate to devices, systems, and methods for interfacing with a target system using a projectile.

A target system is disclosed, according to at least some embodiments. The target system includes an image source configured to project an image onto a surface of a target. The surface of the target can retain a projectile. The target system also includes one or more sensors that detect a location of the projectile extending through the surface of the target. An appearance of the image projected on the surface of the target can be altered relative to the location at which the projectile is detected at the surface of the target.

The target system can also include a computing device operably coupled to the image source and the one or more sensors. The computing device can include a computer-readable medium and a processor coupled to the computer-readable medium. The computer-readable medium can have executable instructions. The processor can be configured to execute the executable instructions, wherein when executed, the executable instructions cause the computing device to perform operations. The operations can determine a surface area of the surface of the target; subdivide the surface area into a plurality of regions; and determine, using the one or more sensors, a region of the plurality of regions that correlates to the location at which the projectile is detected at the surface of the target. The operations can also maintain user information on the computer-readable medium.

The target system can also include a portable electronic device communicatively coupled to the image source and configured to supply electrical signals dictating the image projected by the image source. The portable electronic device can receive input from a user to dictate the image projected by the image source. The one or more sensors can emit infrared light and be coupled to the target by a sensor mount. The surface of the target can be at least partially overlaid by a material that has a reflective coefficient of at least 155 cd/lx·m$^2$. The image source can be a projector positioned at a distance from the target. The projectile can be an arrow shot from an archery bow.

Another target system is disclosed, according to at least some embodiments. The target system includes an image source configured to project a first image onto a surface of a target. The target system includes one or more sensors configured to detect a location at which a projectile enters the surface of the target. The target system also includes a computing device operably coupled to the image source and the one or more sensors. The computing device also includes a computer-readable medium and a processor coupled to the computer-readable medium. The computer-readable medium can have executable instructions. The processor can be configured to execute the executable instructions, wherein when executed, the executable instructions cause the computing device to perform operations. The operations can determine, using the one or more sensors, a position of the projectile relative to the first image based on the location at which the projectile entered the surface of the target; and transition, based on the position of the projectile relative to the first image, from the first image to a second image. The operations can also maintain user information on the computer-readable medium.

An attribute of the first image can be altered to form the second image. The attribute of the first image can be at least one of a color, position, size, shape, appearance, or a quantity of the first image. The target system can further include a portable electronic device communicatively coupled to the image source and configured to supply electrical signals dictating the first and second images projected by the image source. The portable electronic device can receive input from a user to dictate the first and second images projected by the image source. The one or more sensors can emit infrared light and can be coupled to the target by a sensor mount. The surface of the target can be at least partially overlaid by a material that has a reflective coefficient of at least 155 cd/lx·m$^2$. The image source can be a projector. The projectile can be an arrow shot from an archery bow.

A method of interfacing with a target system using a projectile is disclosed, according to some embodiments. The method includes projecting a first image on a surface of a target using an image source. The method also includes detecting, using one or more sensors, a location at which the projectile pierces the surface of the target. The method also includes projecting, using the image source, a second image on the surface of the target based on the location at which the projectile pierces the surface of the target.

The first and second images can include a virtual object which performs an animation affect when the location at which the projectile is disposed within the surface of the target overlays a portion of the virtual object. The projectile can be a first projectile and the method can further include detecting, using the one or more sensors, a location at which a second projectile is disposed within the surface of the target; and projecting, using the image source, a third image on the surface of the target based on the location at which the second projectile is disposed within the surface of the target. Optionally, the method can include calibrating, prior to disposing the projectile into the surface of the target, the target system using the one or more sensors.

BRIEF DESCRIPTION OF THE DRAWINGS

The disclosure will be readily understood by the following detailed description in conjunction with the accompanying drawings, wherein like reference numerals designate like structural elements, and in which:

FIG. 3A shows a front view of a target face and one or more sensors of a target system, according to an embodiment.

FIG. 3B shows a front view of a grid overlaid onto the target face shown in FIG. 3A.

DETAILED DESCRIPTION

Figure 1:
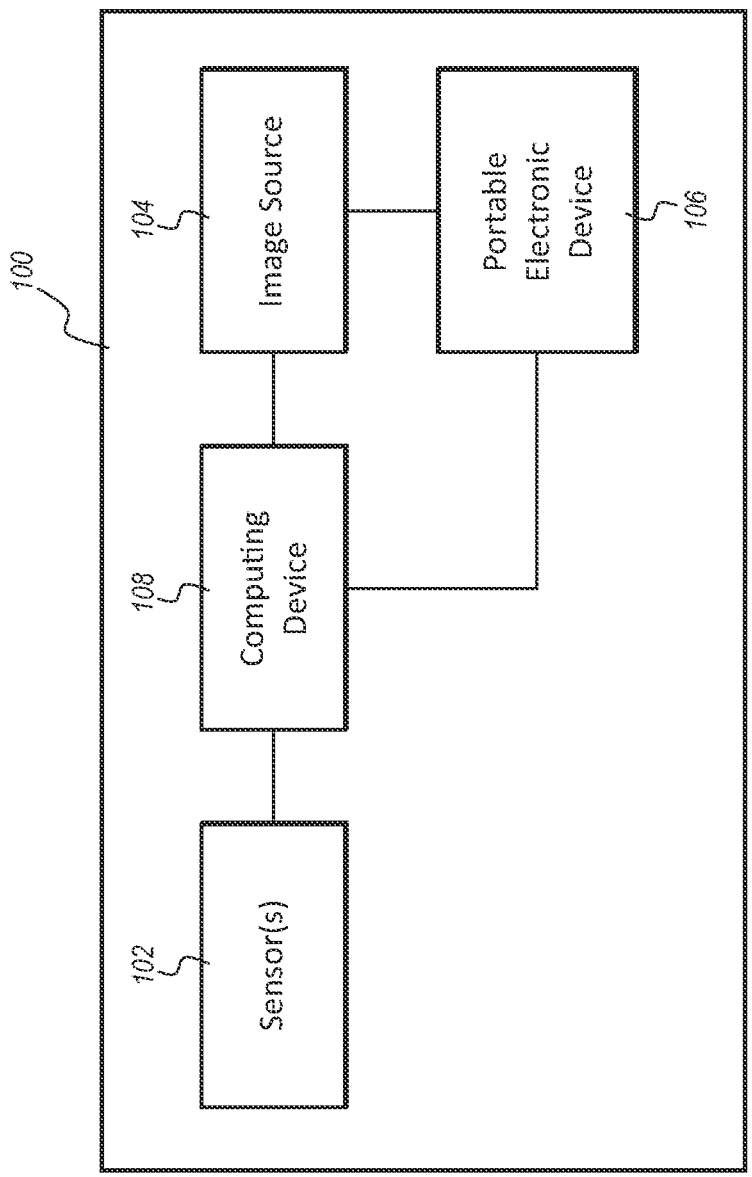
FIG. 1 is a block diagram for a target system, according to an embodiment.

The present description provides various examples that are not limiting of the scope, applicability, or configuration set forth in the claims. Thus, it will be understood that changes can be made in the function and arrangement of elements discussed, without departing from the spirit and scope of the disclosure, and various examples can omit, substitute, or add other procedures or components, as appropriate. Also, features described with respect to some examples can be combined in other examples.

Archery is a sport in which an archer draws and releases a bowstring of an archery bow to launch an arrow or other projectile down-range. Millions of people around the world regularly participate in archery using different types of archery bows, including recurve bows, compound bows, and/or crossbows. The rigors of drawing (i.e., pulling the bowstring) and shooting an archery bow (i.e., releasing the bowstring) can provide many benefits to the participant, for example, physical and mental health benefits. However, some prospective archers fail to reap these benefits because developing a skillset in archery requires repetition and practice. Unfortunately, these prospective archers find repeatedly launching arrows at a target a tedious and unentertaining task. Thus, a dynamic and interactive target system can provide an entertaining archery experience that retains and attracts new archers to further grow the sport of archery.

An example of a dynamic and interactive target system can include a target, an image source, and one or more sensors. The target can include a body which can retain one or more arrows launched at the target. In some embodiments, the image source can be a projector which projects an image onto the surface of the target body. For example, the image source can project an array of numbered blocks that need to be shot by the archer in a particular sequence. The one or more sensors can detect a location at which an arrow pierces the surface of the target when it penetrates the body of the target. The location at which the arrow penetrates through the surface of the target can vary a visual appearance of the image projected on the target. For example, the position of the arrow can cause the appearance of a virtual object of the projected image to change or become altered (e.g., the arrow can pop a virtual balloon projected onto the surface of the target). Alternatively, or additionally, the position of the arrow can act as a barrier that interacts with other virtual objects of the projected image on the surface of the target (e.g., causes a second balloon to bounce off a previously launched arrow as the balloon drops from an upper region of the surface to a lower region of the surface).

In some examples, the target system can include a computing device (e.g., a controller, a field programmable gate array (FPGA), computing tower, or other computing device) communicatively coupled to the image source and the one or more sensors. The computing device can include a computer-readable medium having executable instructions and a processor coupled to the computer-readable medium. The processor can execute the executable instructions. When executed, the executable instructions can cause the computing device to perform various tasks. For example, the executable instructions can cause the computing device to determine, using the one or more sensors, the location of the arrow relative to various virtual objects of the image projected by the image source. The executable instructions can also cause the computing device to transition or alter the image projected by the image source to a new or modified image based on the location of an arrow that has been shot and penetrated the surface of the target.

In some examples, the target system can include a portable electronic device communicatively coupled to the image source, such as, a smartphone or a tablet computing device positioned on a stand next to the archer (e.g., an interactive display on a kiosk). The portable electronic device can include a user interface which receives user input to vary the image projected onto the surface of the target. For example, the portable electronic device can provide a user interface which enables the archer to select from a list of games or challenges to be undertaken by one or more archers. The games or challenges can be programs stored as computer readable medium on the portable electronic device or on a server communicatively coupled to the portable electronic device. The portable electronic device can execute programs that cause the user interface to depict an archer's shooting statistics (e.g., accuracy, number of games or challenges completed, number of arrows shot per day or per month, archer's rank amongst other participants, etc.). The programs can be executed by a processor disposed within the portable electronic device.

The target system of the present disclosure can be implemented at a location capable of accommodating a target, such as, an archery shooting range. For example, the target system of the present disclosure can be retrofitted onto an existing archery target such as a target previously disposed within an archery shooting range. Embodiments of the target system of the present disclosure can be implemented without altering the lighting of the archery shooting range, such as by reducing the amount of lighting to render the image projected on the target visible by the archer. Instead, in some examples, a material covering can be overlaid over the surface of the target to increase or otherwise improve one or more visual characteristics of the image projected onto the target without altering the ambient light at the archery shooting range. The material can have properties that improve the visual appearance of the projected image (e.g., brightness, sharpness, contrast, saturation, etc.) compared to merely projecting the image onto a surface of an existing target itself. For example, the material can have a reflective coefficient such that more of the light projected by the display is reflected by the material to improve the archer's visibility of the image.

The target systems disclosed herein can also enable an archer to utilize the archer's specific archery bow and arrow combination. In other words, the archer does not need to shoot a particular type of archery bow (e.g., a compound bow, a recurve bow, and a crossbow), particular size or length of arrow, modify arrow components, or otherwise modify their draw weight, draw length, or arrow velocity to utilize the target systems disclosed herein.

These and other examples are discussed below with reference to FIGS. 1-5. However, those skilled in the art will readily appreciate that the detailed description given herein with respect to these figures is for explanatory purposes only and should not be construed as limiting. While the present disclosure primarily references arrows as a projectile, persons having skill in the art will appreciate other projectiles and/or objects can be equally applicable to the present disclosure. As non-limiting examples, missiles thrown in darts, hatchet throwing, and a foil (or other weapon) wielded while fencing all find application in the present disclosure.

FIG. 1 shows a block diagram of a target system 100 as discussed herein, including one or more sensors 102, an image source 104, a portable electronic device 106, and a computing device 108. Those skilled in the art will readily appreciate that the block diagram shown in FIG. 1 is merely one non-limiting example of a target system. Other target systems having more or fewer components are also contemplated by this disclosure. For example, the computing device 108 and the portable electronic device 106 can be a singular or unitary portable electronic device which can perform all of the functionality of the computing device 108 and portable electronic device 106 disclosed herein. The target system 100 can include a target (not shown in FIG. 1) or otherwise be retrofitted onto a target previously disposed at an archery range or other location. The target system 100 can be utilized to provide a dynamic and interactive archery experience which utilizes one or more images projected onto a surface of the target.

The one or more sensors 102 can collect data representative of the location of one or more projectiles or arrows on the target (i.e., the location where the projectile extends through the surface of the target). For example, the one or more sensors 102 can determine a distance between each of the one or more sensors 102 and one or more arrows on the target. The data representative of the location of the arrow(s) can be utilized by the computing device 108 to determine a respective location or position of each arrow within the surface of the target. The one or more sensors 102 can include any type of technology now known or subsequently developed that is capable of detecting the position of the arrow relative to the target, such as, technologies that utilize light and/or sound waves (e.g., LIDAR, sonar, ultrasonic sonar, etc.). For example, the one or more sensors can include infrared cameras which project infrared light and subsequently collect reflected infrared light using one or more lenses. The one or more sensors 102 can include filters, such as, band pass, low, pass, or high pass, filters to regulate the wavelengths of light or sound that can be collected by the sensor 102. The ability of the one or more sensors 102 to collect data representative of the location of the one or more arrows within the surface of the target will be discussed in more detail below with reference to FIGS. 2 and 3A.

In some embodiments, each the one or more sensors 102 can utilize a camera having a resolution of one or more megapixels. The data collected by each of the one or more sensors 102 can be monochromatic (i.e., shades of a single color) to reduce data collected by the sensor 102 and increase the speed at which the target system 100 detects a location of an arrow. For example, each of the one or more sensors 102 can be a 5 megapixel USB camera which captures monochromatic images. Additionally, or alternatively, each the one or more sensors 102 can be cameras which emit infrared light at a frequency of about 850 nm and also include an 850 nm band pass filter. Each of the one or more sensors 102 can include a lens, for example, a 100 degree non-distortion lens, a 2.97 mm non-distortion lens, a 12 mm lens, an 8 mm lens, or any other lens or lens combinations known to those skilled in the art.

Figure 2:
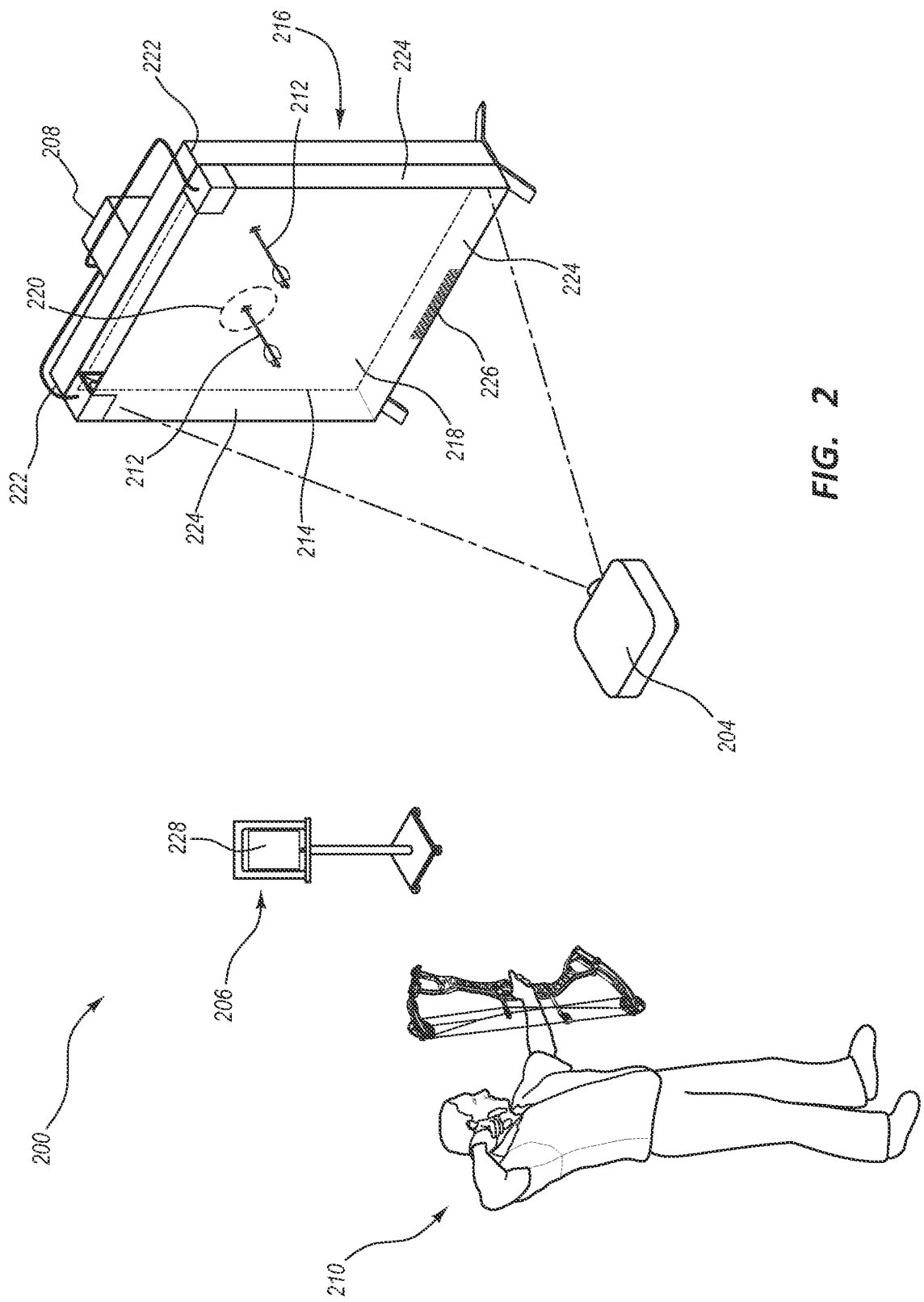
FIG. 2 shows a perspective view of a target system, according to an embodiment.

The one or more sensors 102 can be communicatively coupled to the computing device 108 and pass the data representative of the location of the arrow relative to the face of the target to the computing device 108. The data can be passed through one or more wired connections, wireless connections, or a combination thereof. The computing device 108 can utilize the data to determine a position of each arrow relative to the image being displayed on the surface or face of the target. Determining the position of each arrow in relation to the image being displayed on the surface of the target will be discussed in more detail below with reference to FIGS. 3B-3C. The one or more sensors 102 can be directed or oriented parallel to the surface or face of the target to detect projectiles disposed within the surface or face of the target. For example, the one or more sensors 102 can be disposed at a distance from the target or they may be coupled directly to the target (such as shown in FIG. 2).

The image source 104 can project an image onto the surface of the target. The image can include one or more virtual objects depicted on the surface or face of the target (see FIGS. 3C and 3D). The virtual objects can be stationary, mobile (or animated), or a combination thereof relative to the surface of the target. For example, the virtual objects can remain in a particular position on the surface of the target until the archer launches an arrow into the surface of the target. Upon receipt of the arrow through the surface and into the body of the target, the virtual objects can undergo an animation effect responsive to the location at which the arrow entered the surface of the target and/or the position of the arrow relative to the virtual objects. For example, the virtual objects can be an array of fireworks with respective fuses, wherein when an arrow strikes the target at a location associated with one of the fuses, an animation effect illustrates the firework igniting and shooting upward toward the top of the target face before exploding.

The image source 104 can be any device now known or subsequently developed which can depict an image on the surface of the target. For example, the image source 104 can include, for example, one or more projectors utilizing light-emitting diodes (LEDs), liquid crystal display (LCD) technology, digital light processing (DLP) technology, laser based projection technologies, or a combination thereof. The image source 104 can be communicatively coupled to the portable electronic device 106, the computing device 108, or both. The portable electronic device 106 and/or the computing device 108 can provide electronic signals to the image source 104 that cause the image source 104 to depict a particular image or set of images on the surface of the target. For example, one or both of the portable electronic device 106 and the computing device 108 can include a computer-readable medium having executable instructions and a processor coupled to the computer-readable medium. The processor can execute the executable instructions. When executed, the executable instructions can cause the portable electronic device 106 and/or the computing device 108 to send electrical signals to the image source 104 that generates or alters the image projected by the image source 104.

The image source 104 can be disposed a distance from the surface or face of the target. For example, the image source 104 can be disposed substantially orthogonal to the surface of the target at a distance between about 4 meters to about 6 meters from the surface of the target. The image source 104 does not necessarily need to be disposed orthogonal to the surface of the target. Rather, the image source 104 can be positioned at any position capable of displaying an image on the surface of the target. For example, the image source 104 can be positioned to the side of the target or even behind the target and utilize one or more mirrors to reflect the image onto the surface of the target.

The portable electronic device 106 can be a tablet computing device, smartphone, smartwatch, laptop computing device, or any other electronic device capable of performing the functions described herein. The portable electronic device 106 can include a user interface which receives user input (e.g., through a touch screen, buttons, voice command, etc.) to select the image projected onto the surface of the target. For example, the portable electronic device 106 can provide a user interface which allows the archer to select from a list of operational programs (e.g., games or challenges). The operational programs can be stored as computer readable medium on the portable electronic device 106 or on a server communicatively coupled to the portable electronic device 106. The portable electronic device 106 can execute the operational programs to cause a display on the portable electronic device 106 to display an archer's user information (e.g., accuracy, number of games or challenges completed, number of arrows shot per day or per month, archer's rank amongst other participants, etc.). The operational programs can be executed by a processor disposed within the portable electronic device 106.

The computing device 108 can include a memory storage having a plurality of programs stored thereon. The computing device 108 can include a processor equipped to access and execute the programs. In some examples, the computing device 108 can determine the location of the arrow from the data representative of the location(s) of the arrow(s) via execution of one or more of the programs. For example, one or more of the plurality of programs may: calibrate the target system 100 using the one or more sensors 102; analyze the data representative of the location of an arrow to determine a location of the arrow, compare the determined location of the arrow with a position of one or more virtual objects projected on the surface of the target by the image source 104; cause the image source 104 to modify the virtual objects based on the comparison between the determined location of the arrow and the position of the one or more virtual objects; another act; or a combination thereof.

FIG. 2 is a schematic of a target system 200 during use, according to some embodiments. The target system 200 can include one or more sensors 202 an image source 204, a portable electronic device 206, and a computing device 208. While using the target system 200, a user (e.g., an archer 210) can launch one or more projectiles (e.g., one or more arrows 212) into a surface or face 214 of a target 216. The one or more sensors 202 can detect respective locations at which the one or more arrows 212 penetrate the face 214 of the target 216. The image source 204 can project an image 218 onto the face 214 of the target 216. The portable electronic device 206 and/or the computing device 208 can cause the image source 204 to alter or modify the image 218 based on the location of the one or more arrows 212 relative to the image 218. For example, the image 218 can be a bullseye target formed from multiple colored rings (e.g., a virtual object 220). As each arrow 212 strikes the target 216, the image source 204 can project a point value above each arrow 212 that corresponds to the particular colored ring of the bullseye (virtual object 220) that the arrow 212 appeared to strike. In this example, the original bullseye can be a virtual object 220 of a first image projected onto the surface 214 and the point value temporarily displayed above each arrow can be a virtual object of a second image.

The one or more sensors 202 can be substantially similar to, and can include some or all of the features of the other sensors described herein, such as, the one or more sensors 102. The one or more sensors 202 can be directly coupled to target 216 in some embodiments. For example, as shown in FIGS. 2 and 3A-3D, the one or more sensors 202 can be directly coupled to respective corners 222 of the target 216. Alternatively, or additionally, the one or more sensors 202 can be disposed within a sensor mount (see FIGS. 4A and 4B). While the figures illustrate a pair of sensors 202, each disposed at respective upper corners 222 of the target 216, those skilled in the art will readily appreciate that this is merely one example embodiment. In other embodiments, more or fewer sensors can be included in the target system 200. The sensors 202 can be positioned at respective corners 222 or positioned elsewhere relative to the target 216. In fact, multiple sensors 202 can be positioned within the same corner 222 or may not be directly coupled to the target 216 (e.g., positioned on the floor below the target 216).

In some embodiments, the target system 200 can include one or more panels 224 extending around a periphery (or a portion thereof) of the face 214 of the target 216. The one or more panels 224 can each include a solid color to aid the one or more sensors 202 in detecting the presence of an arrow 212 at the face 214 of the target 216. For example, the one or more sensors 202 can be used in conjunction with the computing device 208 to implement computer vision to detect the arrows 212 at the face 214 of the target 216 and the color of the arrow 212 can contrast with the color of each panel 224 to effectuate more accurate detection (e.g., using computer vision). In other words, each of the one or more panels 224 can act as a backdrop or a benchmark for the one or more sensors 202.

Additionally, or alternatively, a graphic 226 can be disposed on each of the one or more panels 224 which can be detected by the one or more sensors 202 to calibrate the target system 200. As one non-limiting example, the graphic 226 can be a checkerboard pattern defined by black and white squares, wherein each square defines a 1 square inch surface area. The one or more sensors 202 and the computing device 208 can be utilized to determine a size or area of the face 214 using the graphic 226. For example, the perceived size of each of the squares of the checkerboard pattern can dictate a distance that the panel is displaced from the sensor 202. Thus, the position of the one or more sensors 202 and the distance between the graphic 226 and the one or more sensors 202 can be used to determine or calculate a width W and height H of the face 214 using the graphic 226 (see FIG. 3A). The width W and height H of the face 214 can be used to associate the face 214 with a grid and thereby correlate the location of each arrow 212 with the image 218. This aspect of the present disclosure will be discussed in greater detail below with reference to FIGS. 3A-3D.

The image source 204 can be substantially similar to, and can include some or all of the features of the other image sources described herein, such as, image source 104. In some examples, the image source 204 can be disposed a distance relative to the face 214 of the target 216. While the image source 204 is shown to be positioned substantially orthogonally to the face 214 in FIG. 2, the image source 204 can be disposed at any position relative to the target 216. For example, the image source 204 can be at least partially disposed laterally relative to the face 214 of the target 216 (e.g., disposed toward a lateral side of the face 214). In examples, the image source 204 may be positioned such that one or more mirrors (not shown) may be required to direct the image 218 onto the face 214 of the target 216. For example, the image source 204 can be disposed behind the target 214 and a mirror (not shown) can be utilized to direct light projected by the image source 204 to the face 214 of the target 216.

In some embodiments, the face 214 of the target 216 may comprise a material covering configured to increase or otherwise improve one or more visual characteristics of the image 218 projected onto the target 216 without altering the ambient light at the archery shooting range. The material can have properties that improve the visual appearance of the image 218 (e.g., brightness, sharpness, contrast, saturation, etc.) compared to merely projecting the image 218 directly onto the face of a known prior art target. For example, the material can have a reflective coefficient of at least 155 cd/lx·m$^2$; between about 155 cd/lx·m$^2$ to about 300 cd/lx·m$^2$; between about 300 cd/lx·m$^2$ to about 400 cd/lx·m$^2$; between about 400 cd/lx·m$^2$ to about 500 cd/lx·m$^2$; greater than about 500 cd/lx·m$^2$; or less than about 300 cd/lx·m$^2$. The material can have any reflective coefficient that increases the quantity of the light projected by the image source 204 that is reflected by the material to improve the archer's visibility of the image 218. The material can be adhered, fastened, or otherwise overlaid onto the body of the target 216 so as to comprise the face of the target 216. Additionally, or alternatively, the one or more panels 224 can also be covered with the material to increase the amount of light (e.g., IR light) reflected off of the panel 224 by the one or more sensors 202. In some examples, increased reflected light can allow the target system 200 to more easily recognize the arrow 212 within the face 214 of the target 216 (e.g., reflected light can generate a sharper contract between the arrow and the panel).

The portable electronic device 206 can be substantially similar to, and can include some or all of the features of the other portable electronic devices described herein, such as, portable electronic device 106. The portable electronic device 206 can be a tablet computing device, smartphone, smartwatch, laptop computing device, or any other electronic device capable of performing the functions described herein. The portable electronic device 206 can be used by the archer or another person to select the particular image(s) 218 projected onto the target 216 by the image source 204. The portable electronic device 206 can include a display 22, such as, an LCD, LED, QLED, OLED, or other display technologies. For example, the display 228 can depict a user interface which receives user input to select the image 218 projected onto the surface 214 of the target 216. In some embodiments, the portable electronic device 206 can provide a user interface which allows the archer to select from a list of operational programs (e.g., games or challenges). The operational programs can be stored as computer readable medium on the portable electronic device 206 or on a server communicatively coupled to the portable electronic device 206.

In some embodiments, the portable electronic device 206 can also, or alternatively, execute the operational programs to cause a display 228 of the portable electronic device 206 to depict information related to the archer 210. For example, each archer who uses the target system 200 may generate a profile associated with the particular archer. Each profile may include user information stored on the portable electronic device 206 or otherwise be accessible by the portable electronic device 206. The user information can include the archer's statistics, such as, the archer's overall-accuracy or accuracy during a particular game or challenge, a number representing the quantity of games or challenges satisfactorily completed by the archer 210, a quantity of arrows shot by the archer 210 over a given period, a total number of hours the archer has used the target system 200, a rank held by the archer 210 as compared to user information relating to other archers who have used the target system 200, and the like. The user information described herein are merely non-limiting examples of the kinds of information that may be provided by the portable electronic device 206. As such, other types of information are contemplated within this disclosure, such as, information related to an archer, a group of archers, a game or challenge, a group of games or challenges, a virtual coach, and the like. Moreover, the user information may be stored on and accessible from the portable electronic device 206, the computing device 208, a server farm, cloud storage, or a combination thereof.

The operational programs which provide games or challenges can be configured to provide various modes of gameplay. For example, the operational programs can provide gameplay relating to one archer versus another archer; an archer versus a non-archer (third party); an archer versus the game or a virtual archer; or a combination thereof. Gameplay modes relating to archer versus archer and archer versus the game will be described in further detail below with reference to FIGS. 3C and 3D. In embodiments, the display 228 of the portable electronic device 206 can be utilized by a non-archer or a person not currently launching arrows at the target 216 (e.g., a third party) to interact with the archer 210 through the target system 200 (e.g., an archer versus non-archer gameplay mode). In other words, the display 228 can receive input from a person which manipulates the virtual objects 220 projected onto the face 214 of the target 216. As a non-limiting example, the person or third party may rearrange a series of virtual objects 220 (e.g., cups) projected onto the face 214 of the target 216. One of the cups can be covering a coin or other object that the archer 210 intends to track while the cups are rearranged by the third party. The archer 210 can launch an arrow 212 into the cup that the archer believes is covering the coin in order to "displace" the cup and reveal the coin (or reveal nothing if the archer 210 shoots the wrong cup).

The computing device 208 can be substantially similar to, and can include some or all of the features of computing devices known to those skilled in the art. Furthermore, in some embodiments, the computing device 208 can be directly coupled to the target 216 or otherwise disposed adjacent or some distance from the target 216. The computing device 208 can be communicatively coupled to the one or more sensors 202, the image source 204, the portable electronic device 206, or a combination thereof. For example, the computing device 208 can utilize a wired or wireless connection. One or more of the one or more sensors 202, the image source 204, the portable electronic device 206, or the computing device 208 can include wireless communication components (e.g., receiver, transmitter, transceiver, antenna, etc.) which enable wireless communication, such as, Wi-Fi, Bluetooth, or other wireless communication protocol. In some embodiments, the target system 200 can include a singular electronic device having the functionality of both the computing device 208 and the portable electronic device 206, as disclosed herein.

FIGS. 3A-3D illustrate one non-limiting example of how one or more components of the target system can determine a position of an arrow within a target face relative to virtual objects projected onto the target face and thereafter alter or modify the virtual objects based on the determined position of the arrow. A person of ordinary skill in the art will appreciate that the example described below and depicted in FIGS. 3A-3D is merely one example. Accordingly, any combination of components, algorithms, or processes are contemplated within this disclosure that retrieves information or data and thereafter processes or interprets that information or data to determine the position of the projectile relative to one or more virtual objects displayed on a target. For example, the one or more sensors can rely on technologies that utilize light and/or sound waves (e.g., LIDAR, sonar, ultrasonic sonar, etc.) in conjunction with computer vision or another mechanism for recognizing the position of an object relative to another object.

Figure 3C:
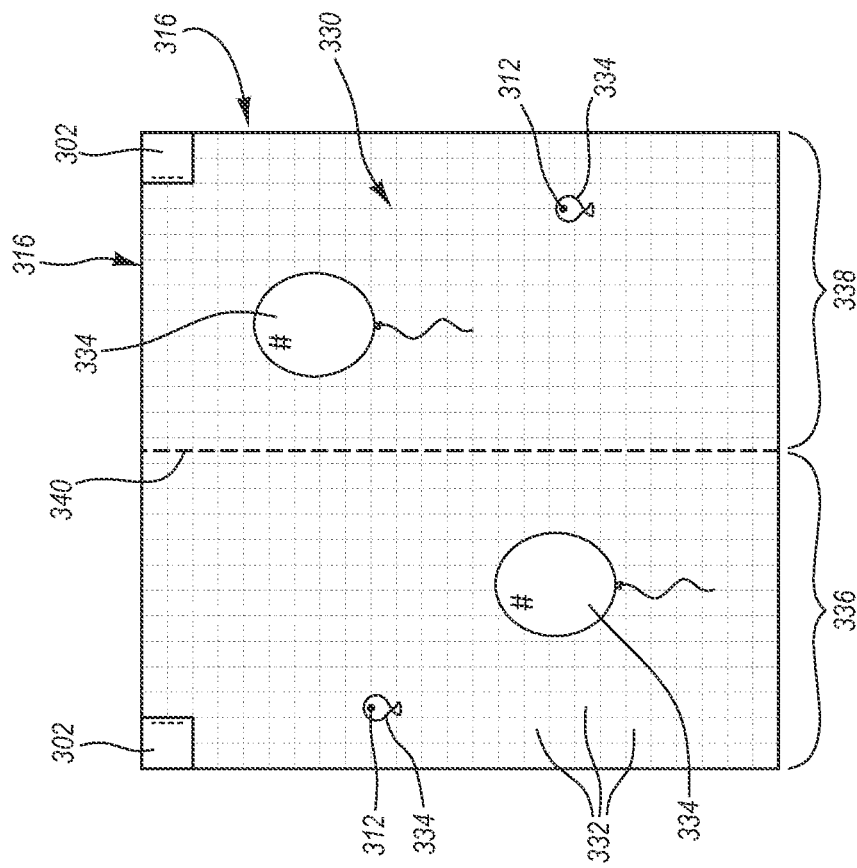
FIG. 3C shows a front view of the grid and one or more virtual objects overlaid onto the target face shown in FIG. 3A.

FIG. 3A shows one or more sensors 302 disposed on a face 314 of a target 316, according to an embodiment. The one or more sensors 302 can be substantially similar to, and can include some or all of the features of the other sensors described herein, such as, the one or more sensors 102, 202. The one or more sensors 302 can be directly coupled to the face 314 of the target 316, for example, respective sensors 302 can be disposed at the upper corners 322 of the target 316 (as illustrated in FIG. 3A). The target 316 can be substantially similar to, and can include some or all of the features of the other targets described herein, such as, the target 216. While the one or more sensors 302 are depicted as positioned at the upper corners 322 of the target 316 in FIGS. 3A-3D, the one or more sensors 302 can be disposed at other locations relative to the target 316 in other embodiments (e.g., other locations on the face 314 of the target 316, off the target 316, or a combination thereof).

In some embodiments, the one or more sensors 302 can be used to calibrate the target system. For example, as described herein and shown in FIG. 2, the one more sensors 302 can be calibrated using the one or more panels 224 having a graphic 226 recognizable or detectable by the one or more sensors 302. Additionally, or alternatively, measurements relating to the size (e.g., height and width dimensions) of the face 314 of the target 316 can be input and stored within a computing device (e.g., computing device 108, 208) to calibrate the one or more sensors 302. Additionally, or alternatively, the target system can be calibrated by other techniques. For example, a user of the target system can dispose an arrow or other detectable object in each of the four corners of an image displayed on the face 314 of the target 316 by an image source; the sensors 302 can be used to detect the position of each arrow; and the computing device can calculate or otherwise determine the surface area of the image based on the position of the arrows at the corners of the face 314.

In some embodiments, at least one of the one or more sensors can determine a respective distance between an arrow and the sensor. For example, the sensor can be an infrared (IR) sensor which emits infrared light and collects rebounded infrared light to determine a distance of an object relative to the sensor. One or both of the sensors 302 depicted in FIGS. 3A-3D can be IR sensors which emit infrared light and subsequently collect the rebounding infrared light. More specifically, the collected, rebounding infrared light can be electronically converted to electrical signals (via the sensors) representative of the rebounded infrared light. The electrical signals can be transmitted to a computing device (e.g., computing device 108, 208) and processed into data representative of the respective distances $d_1$, $d_2$, $d_3$, $d_4$ between the arrows 312 and the respective sensors 302. For example the data can represent that one arrow 312 is distance $d_1$ from the leftmost sensor 302 and is distance $d_2$ from the rightmost sensor 302. A computing device (e.g., computing device 108, 208) can subsequently receive the respective data from each sensor 302 and compare the data to determine a location of the arrow 312 relative to the sensors 302 and, therefore, the location of the arrows on the face 314 of the target 316. Similarly, the data can represent another arrow 312 is distance $d_3$ from the leftmost sensor 302 and distance $d_4$ from the rightmost sensor 302 and the computing device (e.g., computing device 108, 208) can subsequently receive the respective data from each sensor 302 and compare the data to determine a location of the other arrow 312 on the face 314 of the target 316.

The computing device (not shown in FIG. 3A) can generate an organized structure to correlate the location of each arrow to the image and/or virtual objects projected onto the target face. For example, as shown in FIG. 3B, the computing device can generate a grid system 330 on the face of the target 316 which correlates the surface area of the face 314 (FIG. 3A) to respective regions or cells 332 within the grid system 330. The size of each cell 332 can be dependent on dimensions of the face 314 and the desired resolution of the grid system 330. For example, a relatively larger target face (e.g., a height of 3 meters by a width of 3 meters) may require more cells 332 or larger cells 332 than a relatively smaller target face (e.g., a height of 1.5 meters by a width of 1.5 meters). Other factors, such as arrow diameter, the size of each virtual object, and the like can dictate or otherwise influence the size of each cell 332 within the grid system 330. For example, the diameter of the projectile being launched at the target may influence the desired size of each cell 332 (e.g., arrows having smaller diameters may require smaller cells 332 to accurately determine the position of the arrow with respect to an image being projected onto the target face). In some embodiments, each cell 332 of the grid system 330 can be less than 0.5 square centimeters ($cm^2$), between about 0.5 $cm^2$ to about 1 $cm^2$; between about 1 $cm^2$ to about 3 $cm^2$; between about 3 $cm^2$ to about 5 $cm^2$; between about 5 $cm^2$ to about 10 $cm^2$; greater than 10 $cm^2$; or less than 10 $cm^2$.

Accordingly, the location at which each arrow 312 enters the face 314 can be correlated or associated with a respective cell 332 of the grid system 330, for example, the computing device (not shown) can associate one of the arrows 312 with cell 332a and the other arrow 312 with cell 332b, as shown in FIG. 3B. Thereafter, the computing device can compare cells 332a, 332b with respective virtual objects 334a, 334b (shown in FIG. 3C) and cause the image source (not shown) to modify the virtual objects 334a, 334b based on the comparison of the cells 332a, and 332b (i.e., the determined location of the arrows 312) and a position of the one or more virtual objects 334a, 334b on the face 314. For example, the computing device (e.g., computing device 108, 208) can cause the image source (e.g., image source 104, 204) to alter the virtual objects 334a, 334b by applying an animation effect (e.g., each balloon independently deflates or pops after the face 314 is struck by an arrow 312 at a location that correlates with the position of an inflated balloon). Other virtual objects 334c, 334d which have not been "hit" by an arrow 312, may continue to visually resemble prior state (e.g., as inflated balloons that are dynamic or that appear to float around the face 314 of the target 316).

Figure 3D:
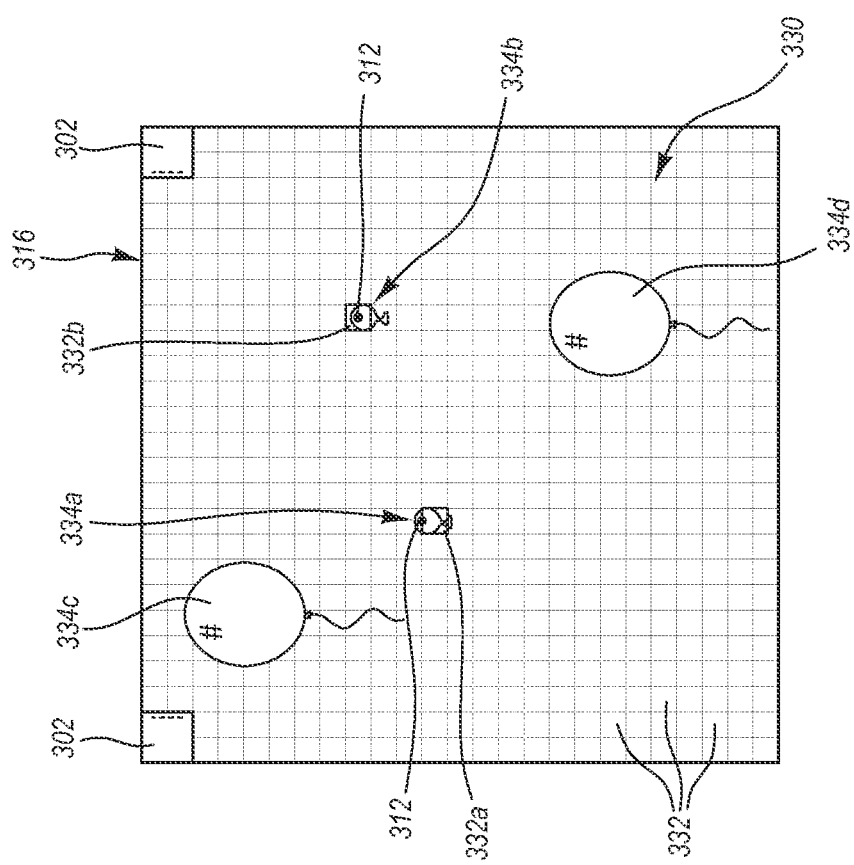
FIG. 3D shows a front view of the target face shown in FIG. 3C bisected into two distinct interactive zones.

FIG. 3D shows an embodiment in which multiple archers can launch arrows into the face of the target to compete against one another. For example, the image source (not shown) can visually bisect the face 314 of the target 316 into a first zone 336 and a second zone 338 using one or more lines 340 projected onto the face 314. Each of the two archers can launch arrows 312 at virtual objects 334 that are displayed within the archer's respective zone 336, 338. While this embodiment is described as incorporating two archers, this disclosure contemplates operational modes that include more than two archers, such as, 3 archers, 4 archers, 5 archers, or more. Accordingly, the face 314 can be divided and demarcated into a sufficient number of zones to accommodate the number of archers participating in the game or challenge. In some embodiments, each zone can have a label projected within the zone that informs respective archers to which zone(s) they are assigned.

In some embodiments, the archers can compete in a head-to-head (archer vs. archer) game or challenge. For example, the archers can compete to see which archer can strike the most virtual objects 334 of a fixed set of virtual objects 334 (e.g., a fixed number of balloons can be displayed on the face 314 and the archer that strikes the most balloons in their respective zone—336 or 338—is the winner). In some embodiments, the virtual objects 334 can be animated such that they move or transition relative to the face 314 of the target 316 to provide an opportunity for each archer to strike the virtual object 334 within the archer's respective zone 336, 338. For example, balloons (i.e., virtual objects 334) can continuously drift or float about the face 314 (i.e., into and out of each of the first zone 336 and second zone 338) to provide an opportunity for each archer to strike one of the balloons with an arrow 312 when it is in their designated zone.

Additionally, or alternatively, the archers can compete in a head-to-head (archer vs. archer) game or challenge in which the archers shoot in turn to see which archer can shoot a predetermined number of virtual objects 334 in the shortest duration of time. For example, a challenge or game may require an archer to shoot three virtual objects 334 at any position on the face 314 of the target 316 (i.e., not necessarily within a respective zone 336, 338). A component of the target system, such as the computing device or portable electronic device, can facilitate the game or challenge (e.g., record the time it takes for each archer to complete the challenge and subsequently declare a winner).

As previously discussed herein, one or more of the virtual objects 334 can perform an animation effect when an arrow 312 enters the face 314 at a location which correlates to a position of the virtual object 334 projected onto the face 314. In other words, when an archer's arrow 312 appears to strike a virtual object 334, the virtual object 334 can perform an animation effect which causes the virtual object 334 to appear to react to the arrow strike (e.g., a balloon deflates or bursts when hit by the arrow or a balloon moves as a result of an arrow striking close to the balloon). Additionally, or alternatively, an arrow 312 (or other projectile) that has been launched into the target 316 can act as an obstacle to one or more of the virtual objects 334 displayed on the face 314. In some embodiments, one or more arrows 312 can vary or modify an attribute (e.g., color, position, size, shape, appearance, quantity, etc.) of the one or more of the virtual objects 334 displayed on the face 314. For example, an arrow 312 previously disposed within the face 314 can cause the virtual object 334 to appear to bounce or rebound off of the arrow 312 as the virtual object moves or drifts about the face 314. As another example, the virtual object 334 can be an avatar of an explorer and the game or challenge can involve launching one or more arrows 312 to provide anchors for the avatar explorer to cross a chasm using a whip. The target systems disclosed and described herein can include any interaction between a projectile which is launched into a target and a virtual object displayed onto the face of the target by an image source. Accordingly, the examples shown in the figures and described herein should not be considered limiting.

The target systems described herein can detect multiple sequential arrows launched into the face of the target. For example, if three arrows were launched into the target sequentially, the computing device and/or portable electronic device can record or otherwise track the respective locations of each arrow within the face of the target as well as the sequence each arrow was launched into the target. In other words, the target system can include components which recognize arrows that were previously launched into the target as well as recognizing an arrow that was most recently launched into the target. The location of each arrow, regardless of the sequence it was launched, can be tracked or monitored for conducting the game or challenge.

Figure 4B:
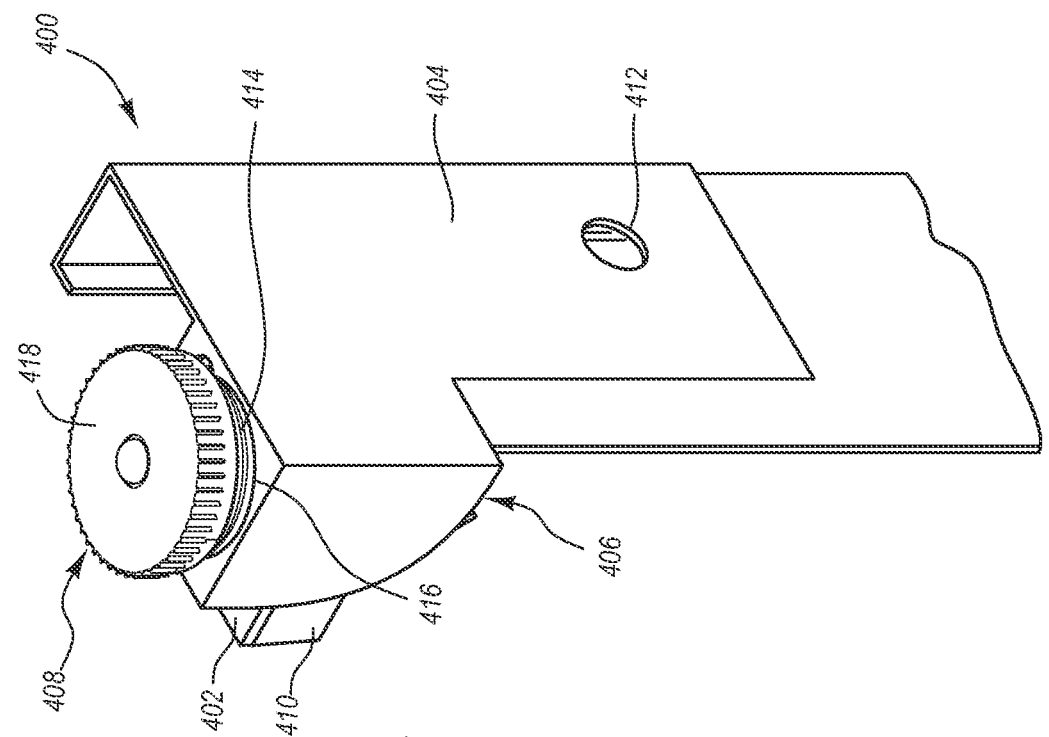
FIG. 4B shows a rear-perspective view of the sensor mount shown in FIG. 4A.
Figure 4A:
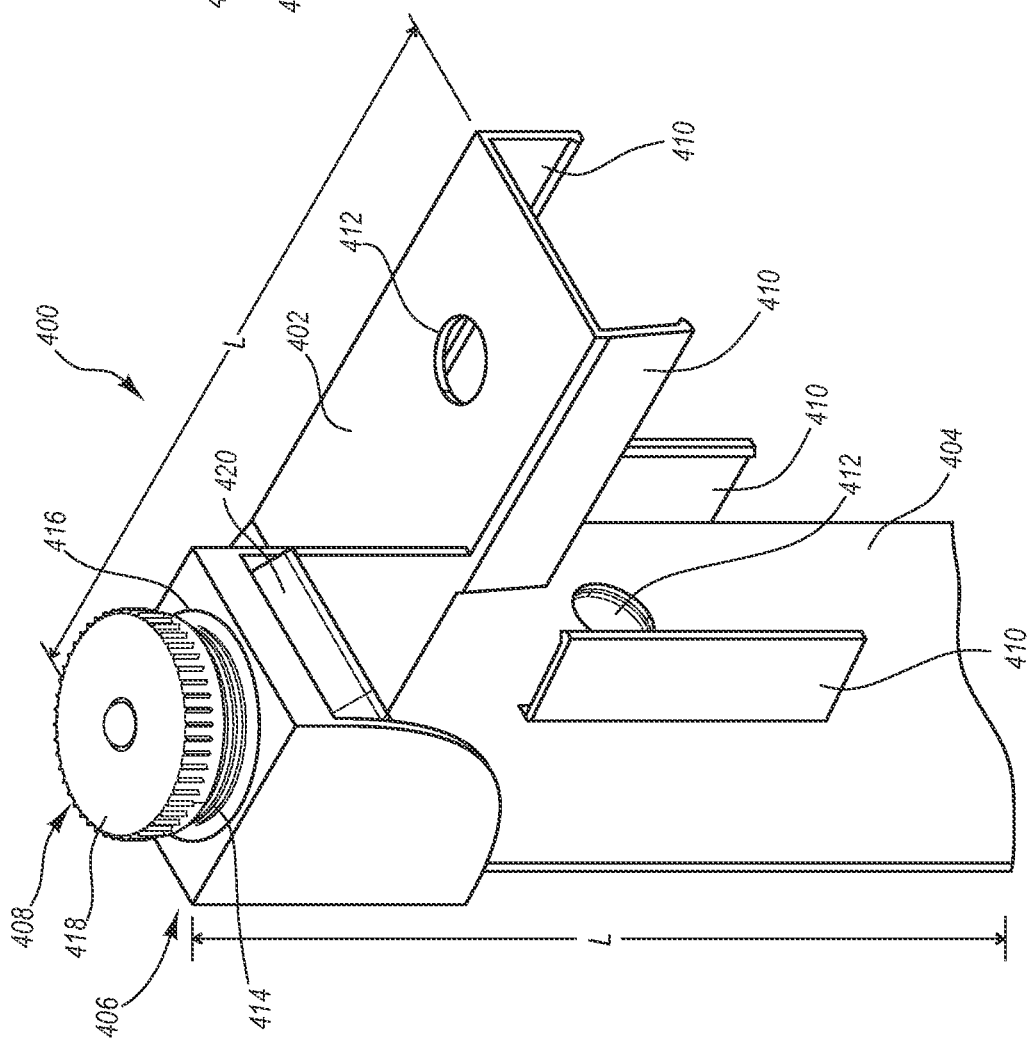
FIG. 4A shows a side-perspective view of a sensor mount for a target system, according to an embodiment.

FIGS. 4A and 4B show side and rear perspective views of a sensor mount 400 including a first mounting structure which can include a first planar member 402, a second mounting structure which can include a second planar member 404, and a receptacle 406, according to at least some embodiments. The sensor mount 400 can be disposed over a corner of a target (e.g., target 216, 316) such that a sensor enclosure 408 releasably retained within the receptacle 406 is directed or oriented parallel to a face (e.g., face 214, 314) of the target. The sensor mount 400 can include metals, metal alloys, polymers, ceramics, or a combination thereof. The sensor mount 400 can be injection molded, machined, 3D-printed, or otherwise manufactured using manufacturing techniques known to those having skill in the art. The sensor mount 400 can have singular or unitary construction in some embodiments. In some embodiments, the sensor mount 400 can include multiple components (e.g., the first planar member 402, the second planar member 404, and the receptacle 406) coupled together using fasteners, adhesives, welds, or a combination thereof.

In embodiments, the first planar member 402 can be perpendicular or orthogonal to the second planar member 404 such that the first and second planar members 402, 404 form a right angle that can be positioned over a corner (e.g., corner 222) of an archery target. Each of the first and second mounting structures can include one or more sidewalls 410. Each of the sidewalls 410 can extend perpendicular or substantially perpendicular to one of the first or second planar members 402, 404 such that a portion of a target can be disposed between the sidewalls 410. In some embodiments, the sidewalls 410 can contact the portion of the target to retain the sensor mount 400 to the target. For example, the sidewalls 410 can retain the portion of the target by an interference fit (i.e., a thickness of the target slightly exceeds a width between respective sidewalls 410 such that each of the sidewalls 410 contact the target to retain the sensor mount 400 to the target). Each of the sidewalls 410 can extend some distance along a respective length L of the first and second planar members 402, 404.

Each of the first and second planar members 402, 404 can define one or more apertures 412. While the sensor mount 400 is positioned on the target, a portion of the target can be exposed or accessible through the one or more apertures 412. A fastener (not shown) such as a nail, spike, screw, hook, rivet, tack, or other elongated object can be extended through the aperture 412 and inserted into the exposed portion of the target to retain the sensor mount 400 to the target. The one or more apertures 412 can each define a respective diameter. The diameter of each aperture 410 can be uniform (i.e., all the apertures 410 have the same diameter) or each respective aperture 410 can define a diameter that is dissimilar from the diameter of another aperture 410 (i.e., one or more apertures 410 can have differing diameters from the other aperture(s) 410). In some embodiments, the diameter of each apertures can be at least 0.5 cm; between about 0.5 cm and 1 cm; between about 1 cm to about 2 cm; between about 2 cm to about 3 cm; between about 3 cm to about 4 cm; between about 4 cm to about 5 cm, greater than 5 cm; or less than 2 cm.

In some embodiments, the sensor mount 400 may include a single planar member instead of the first and second planar members 402, 404 extending orthogonal to one another. In these embodiments, a single planar member can be disposed over at least one of the sides, top, or bottom of the target. The single planar member can include all of the features and components describes herein which relate to the first and second planar members 402, 404. For example, the single planar member can include one or more sidewalls and one or more apertures.

The receptacle 406 can form an internal cavity in which at least a portion of the sensor enclosure 408 can be retained. The receptacle 406 can be laterally offset from the first and second planar members 402, 404 such that the receptacle 406 is positioned adjacent the face of the target or otherwise positioned to orient a sensor (e.g., the one or more sensors 102, 202, 302) disposed within the sensor enclosure 408 parallel to the face of the target (see FIG. 2). A protrusion 414 of the sensor enclosure 408 can extend through an opening 416 formed by the receptacle 406 and threadably receive a cap 418. In embodiments, the cap 418 can enable adjustment of the sensor enclosure 408 relative to the receptacle 406. For example, a user may align a sensor (e.g., the one or more sensors 102, 202, 302) within the sensor enclosure 408 relative to the face of the target by rotating the cap 418 relative to the receptacle 406.

Figure 4D:
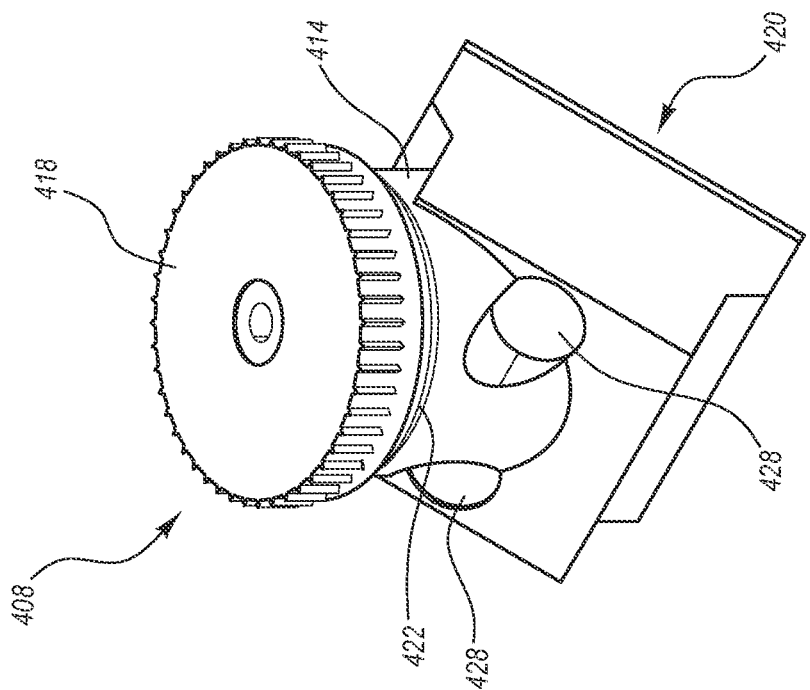
FIG. 4D shows a rear-perspective view of the sensor enclosure shown in FIG. 4C.
Figure 4C:
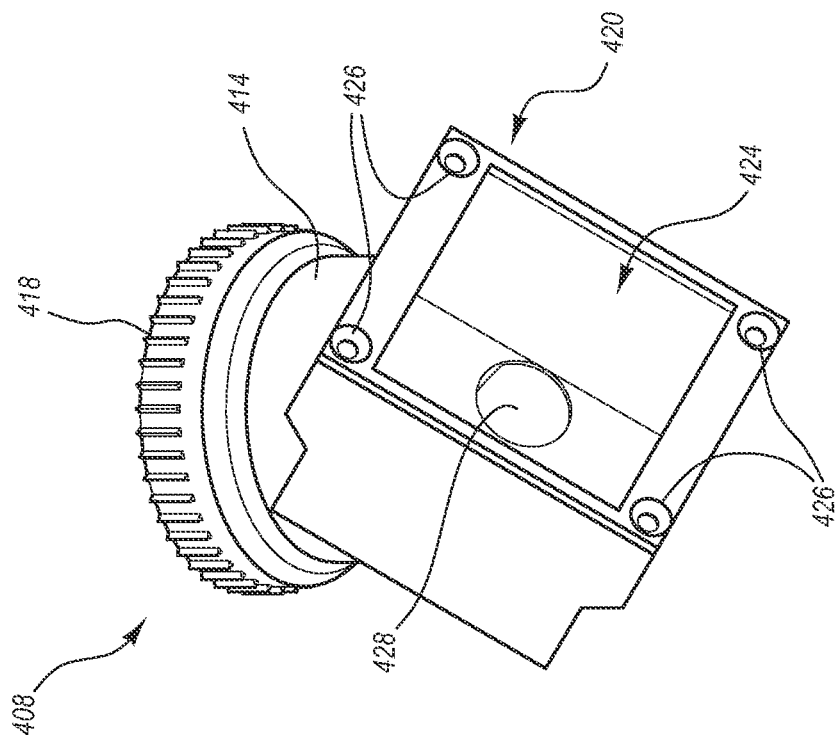
FIG. 4C shows a front-perspective view of a sensor enclosure, according to one embodiment.

FIGS. 4C and 4D show front and rear perspective views of the sensor enclosure 408 including the protrusion 414, the cap 418, and a housing 420, according to at least some embodiments. The sensor enclosure 408 can include metals, metal alloys, polymers, ceramics, or a combination thereof. The sensor enclosure 408 can be injection molded, machined, 3D-printed, or otherwise manufactured using manufacturing techniques known to those having skill in the art. The sensor enclosure 408 can have singular or unitary construction in some embodiments. In some embodiments, the sensor enclosure 408 can include multiple components (e.g., the protrusion 414, the cap 418, and the housing 420) coupled together using fasteners, adhesives, welds, or a combination thereof. The protrusion 414 can extend from the housing 420 and form a circular cross-sectional shape. A distal end 422 of the protrusion 414 can be threaded to interlock with corresponding threads within the cap 418.

The housing 420 can form or define an internal volume 424 which may receive at least a portion of a sensor (e.g., sensor 102, 202, 302). For example, the housing 420 can form multiple holes 426 that can receive fasteners to retain the sensor within the internal volume 424. The housing 420 can define one or more through-holes 428 to provide an outlet for cables, wires, or other components of the sensor. For example, the one or more through-holes 428 can enable wires to span from a computing device (e.g., the computing device 108, 208) through the sensor enclosure 408 and couple with the sensor disposed within the housing 420.

Figure 5:
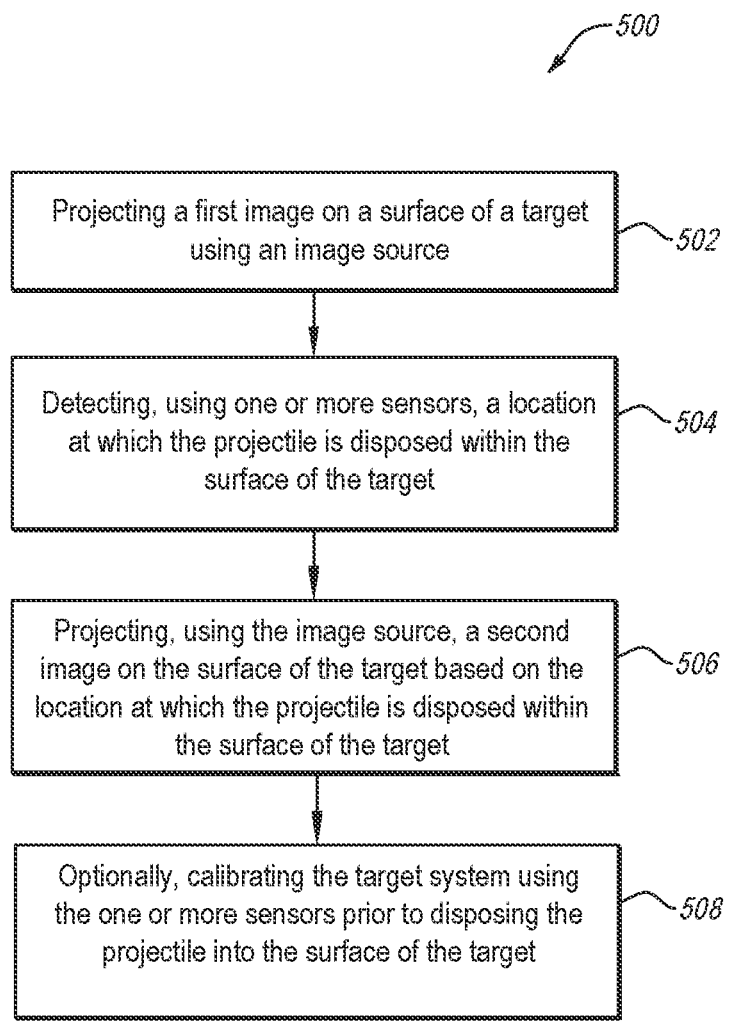
FIG. 5 is a flow diagram of a method for interfacing with a target system using a projectile, according to an embodiment.

FIG. 5 is a flow diagram of a method 500 for interfacing with a target system using a projectile, according to at least some embodiments. The method 500 includes the act 502 of projecting a first image on a surface of a target using an image source. The method 500 further includes the act 504 of detecting, using one or more sensors, a location at which the projectile extends through the surface of the target. Additionally, the method 500 includes the act 506 of projecting, using the image source, a second image on the surface of the target based on the location at which the projectile extends through the surface of the target. Optionally, the method 500 includes the act 508 of calibrating, prior to disposing the projectile into the surface of the target, the target system using the one or more sensors. Accordingly, the method 500 may permit an archer or other party to interface with a target system using a projectile. The method 500 may include more or fewer acts than the acts 502-508. For example, the method 500 may not include the act 508.

The act 502 of projecting a first image on a surface of a target using an image source may include the use of any device now known or subsequently developed which can depict an image on the surface of the target. For example, the image source can include one or more projectors utilizing light-emitting diodes (LEDs), liquid crystal display (LCD) technology, digital light processing (DLP) technology, laser based projection technologies, or a combination thereof. The image source can be communicatively coupled to a portable electronic device and/or a computing device. The portable electronic device and/or the computing device can provide electronic signals to the image source which cause the image source to depict the first image on the surface of the target. For example, one or both of the portable electronic device and the computing device can include a computer-readable medium having executable instructions and a processor coupled to the computer-readable medium. The processor can execute the executable instructions. When executed, the executable instructions can cause the portable electronic device and/or the computing device to send electrical signals to the image source that generates the first image projected by the image source.

The first image can include one or more virtual objects depicted on the surface of the target. The virtual objects can be stationary, mobile, or a combination thereof relative to the surface of the target. For example, the virtual objects can remain in a particular position on the surface of the target until the archer launches an arrow into the surface of the target. Upon receipt of the arrow into the target, the virtual objects can undergo an animation effect responsive to the position at which the arrow entered the surface of the target and/or the position of the arrow relative to the virtual objects.

The image source can be disposed a distance from the surface of the target. For example, the image source can be disposed substantially orthogonal to the surface of the target at a distance between about 4 meters to about 10 meters from the surface of the target. The image source does not necessarily need to be disposed orthogonal to the surface of the target. Rather, the image source can be positioned at any position capable of displaying the first image on the surface of the target. For example, the image source can be positioned behind the target and utilize one or more mirrors to reflect the image onto the surface of the target.

The act 504 of detecting, using one or more sensors, a location at which the projectile is disposed within the surface of the target may include collecting data representative of the location of the projectile within the surface of the target. For example, the one or more sensors can determine a distance between each of the one or more sensors and the projectile. The data representative of the location of the projectile can be utilized by the computing device and/or the portable electronic device to determine the location of the projectile within the surface of the target. The one or more sensors can include any type of technology or combination of technologies now known or subsequently developed that are capable of detecting the location of the projectile relative to the target, such as, technologies that utilize light and/or sound waves (e.g., LIDAR, sonar, ultrasonic sonar, etc.). In some embodiments, the one or more sensors can include infrared cameras which project infrared light and subsequently collect reflected infrared light using one or more lenses. The one or more sensors can include filters, such as, band pass, low, pass, or high pass, filters to regulate the wavelengths of light or sound that can be collected by each of the sensors.

Each of the one or more sensors can be communicatively coupled to the computing device and pass the data representative of the location of the arrow relative to the surface of the target to the computing device. The data can be passed through one or more wired connections, wireless connections, or a combination thereof. The computing device can utilize the data to determine the location of the projectile relative to the image being displayed on the surface of the target. Each of the one or more sensors can be directed or oriented parallel to the surface of the target. For example, each of the one or more sensors can be disposed around the target or otherwise coupled directly to the target.

The act 506 of projecting, using the image source, a second image on the surface of the target based on the location at which the projectile is disposed within the surface of the target can include temporarily or permanently transitioning or transforming the first image into a second image relative to the location at which the projectile is disposed within the surface of the target. For example, a numerical value representing a score (e.g., a virtual object of the second image) can be projected onto the surface of the target when the projectile is disposed within a bullseye (e.g., a virtual object of the first image). However, if the projectile is not disposed within the bullseye (i.e., the archer missed the bullseye), the first image can remain unchanged. Hence, the content projected on the surface of the target (e.g., first image, second image, third image, and so on) can be entirely dependent on the location the projectile is disposed within the surface.

The transition from a first image to a second image, which may or may not include the first image, can be considered an animation effect wherein attributes (e.g., color, position, size, shape, appearance, quantity, etc.) associated with respective virtual objects can be modified or altered. For example, the radius of a bullseye can shrink or decrease with each projectile an archer places within the circumference of the bullseye. In this example, the initial bullseye can be a virtual object of the first image and the subsequent smaller bullseye can be a virtual object of the second image. The virtual objects of the second image can have similar attributes than the attributes of the virtual objects within the first image. Alternatively, or additionally, the second image can include virtual objects that have dissimilar attributes to the attributes of the virtual objects of the first image (e.g., a different color, shape, etc.).

In some embodiments, the image source can project or display a transition graphic while a virtual object of the first image transitions to a virtual object of the second image. For example, the virtual object of the first image can be an inflated balloon and the virtual object of the second image can be a deflated or popped balloon. In this example the transition graphic may depict the balloon seemingly being held in place by the projectile and deflating or shrinking to form the deflated balloon. Other transition graphics are contemplated within this disclosure which modify the virtual object of the first image, such as, resizing, sliding, fading, rotating, morphing, replacing, highlighting, or any other animated transition to from the virtual object of the first image to the virtual object of the second image.

Optionally, the method 500 includes the act 508 of calibrating, prior to disposing the projectile into the surface of the target, the target system using the one or more sensors. In some embodiments, the surface or a panel positioned adjacent the surface can include a graphic or symbol which can be detected by the one or more sensors to calibrate the target system. As one non-limiting example, the graphic or symbol can form a checkerboard pattern defined by black and white squares, wherein each square defines a 1 square inch surface area. The one or more sensors and the computing device can be utilized to determine a size or area of the surface using the graphic. For example, the perceived size of each of the squares of the checkerboard pattern can dictate a distance the graphic is displaced from the sensor 202. Thus, the position of the one or more sensors and the distance between the graphic and the one or more sensors can be used to determine or calculate a width and height of the surface. Additionally, or alternatively, the target system can be calibrated by other techniques. For example, a user of the target system can dispose an arrow or other detectable object in each of the four corners of an image displayed or projected onto the target face of the target to signify to the target system a total surface area of the image. Thereafter, the one or more sensors can be used to detect the position of each arrow and provide data to the computing device which can be used to calculate or otherwise determine the total surface area of the image based on the position of the arrows at the corners of the image.

Any of the features or aspects of the cases discussed herein can be combined or included in any combination. For example, a case can include a coupling member and one or more displays attached to a housing. The one or more displays can be disposed opposite the coupling member relative to the housing. Further, portable electronic devices, including devices described herein, can be housed entirely or partially within an internal volume defined by the housing. For example, one or more portable electronic devices or components thereof can be disposed within the internal volume.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not target to be exhaustive or to limit the examples to the precise forms disclosed. It will be apparent to one of ordinary skill in the art that many modifications and variations are possible in view of the above teachings.

What is claimed is:

1. A target system, comprising:
   a target for receiving projectiles;
   an image source configured to project an image onto a surface of the target;
   one or more sensors configured to detect a location where the projectile extends through the surface of the target; and
   a computing device operably coupled to the image source and the one or more sensors, the computing device comprising:
   a computer-readable medium having executable instructions; and
   a processor coupled to the computer-readable medium and configured to execute the executable instructions, wherein when executed, the executable instructions cause the computing device to alter an appearance of the image projected onto the surface of the target based on the location where the projectile extends through the surface of the target.

2. A target system, comprising:
a target for receiving projectiles;
an image source configured to project an image onto a surface of the target;
one or more sensors detecting a location of the projectile where it extends through the surface of the target; and
a computing device operably coupled to the image source and the one or more sensors, the computing device comprising:
  a computer-readable medium having executable instructions; and
  a processor coupled to the computer-readable medium and configured to execute the executable instructions, wherein when executed, the executable instructions cause the computing device to perform the operations of:
    determining a surface area of the surface of the target;
    subdividing the surface area into a plurality of regions; and
    determining, using the one or more sensors, a region of the plurality of regions that correlates to the location at which the projectile is detected at the surface of the target,
wherein an appearance of the image projected on the surface of the target is altered based on the location at which the projectile is detected on the surface of the target.

3. The target system of claim 2, further comprising a portable electronic device communicatively coupled to the image source and configured to supply electrical signals dictating the image projected by the image source.

4. The target system of claim 3, wherein the portable electronic device is configured to receive input from a user to dictate the image projected by the image source.

5. The target system of claim 2, wherein the one or more sensors emit infrared light and are coupled to the target by a sensor mount.

6. The target system of claim 2, wherein the surface of the target is at least partially overlaid by a material that has a reflective coefficient of at least 155 cd/lx·m².

7. The target system of claim 2, wherein the image source is a projector positioned a distance from the surface of the target.

8. The target system of claim 2, wherein the projectile is an arrow shot from an archery bow.

9. The target system of claim 2, wherein when executed, the executable instructions also cause the computing device to perform the operation of:
maintaining user information on the computer-readable medium.

10. A target system, comprising:
a target for receiving projectiles;
an image source configured to project a first image onto a surface of the target;
one or more sensors configured to detect a location of the projectile at the surface of the target; and
a computing device operably coupled to the image source and the one or more sensors, the computing device comprising:
  a computer-readable medium having executable instructions; and
  a processor coupled to the computer-readable medium and configured to execute the executable instructions, wherein when executed, the executable instructions cause the computing device to perform the operations of:
    determining, using the one or more sensors, a position of the projectile relative to the first image based on the location at which the projectile entered the surface of the target; and
    transitioning, based on the position of the projectile relative to the first image, from the first image to a second image.

11. The target system of claim 10, wherein an attribute of the first image is altered to form the second image while transitioning from the first image to the second image.

12. The target system of claim 11, wherein the attribute of the first image that is altered is at least one of a color, a position, a size, a shape, an appearance, or a quantity of the first image.

13. The target system of claim 10, further comprising a portable electronic device communicatively coupled to the image source and configured to supply electrical signals dictating the first and second images projected by the image source.

14. The target system of claim 13, wherein the portable electronic device is configured to receive input from a user to dictate the first and second images projected by the image source.

15. The target system of claim 10, wherein the one or more sensors emit infrared light and are coupled to the target by a sensor mount.

16. The target system of claim 10, further comprising a material configured to be overlaid onto the surface of the target, the material having a reflective coefficient of at least 155 cd/lx·m².

17. The target system of claim 10, wherein the image source is a projector.

18. The target system of claim 10, wherein the projectile is an arrow shot from an archery bow.

19. The target system of claim 10, wherein when executed, the executable instructions also cause the computing device to perform the operation of:
maintaining user information on the computer-readable medium.

20. A method of interfacing with a target system using a projectile, the method comprising:
projecting a first image on a surface of a target using an image source;
detecting, using a pair of sensors disposed at respective areas on the surface of the target, a set of distance values corresponding to relative distances between a projectile on the surface of the target and the pair of sensors;
determining, using a computing device, a position of the projectile on the surface of the target based on the set of distance values; and
projecting, using the image source, a second image on the surface of the target based on the position of the projectile on the surface of the target.

21. A method of interfacing with a target system using a projectile, the method comprising:
projecting a first image on a surface of a target using an image source;
detecting, using one or more sensors, a location of the projectile on the surface of the target; and
projecting, using the image source, a second image on the surface of the target based on the location of the projectile on the surface of the target, wherein the first and second images include a virtual object, the virtual object performing an animation affect when the location at which the projectile is disposed within the surface of the target overlays a portion of the virtual object.

22. The method of claim 21, wherein the projectile is a first projectile, the method further comprising:
- detecting, using the one or more sensors, a location at which a second projectile pierces the surface of the target; and
- projecting, using the image source, a third image on the surface of the target based on the location at which the second projectile pierces the surface of the target.

* * * * *